United States Patent [19]

Leinenger

[11] Patent Number: 4,574,933
[45] Date of Patent: Mar. 11, 1986

[54] TROUGH FOR OPEN MODULAR CHUTE

[76] Inventor: John T. Leinenger, 7255 Bluewater, Clarkston, Mich. 48016

[21] Appl. No.: 601,674

[22] Filed: Apr. 18, 1984

[51] Int. Cl.⁴ .................. B65G 11/00; B65G 13/00
[52] U.S. Cl. .......................................... 193/1; 118/501;
198/537; 134/104; 104/133
[58] Field of Search ................. 193/1, 2 R, 11, 25 A;
134/104, 137, 155, 201; 405/119; 239/121;
210/400; 198/537; 34/85; 118/31, 501;
137/312; 104/133; 222/108; 248/48.1, 48.2;
52/11, 13, 15

[56] References Cited

U.S. PATENT DOCUMENTS

| 565,151 | 8/1896 | Barlow-Massicks | 193/11 X |
| 1,952,568 | 3/1934 | Schapp et al. | 134/104 X |
| 3,222,828 | 12/1965 | Kvan | 405/119 |
| 3,486,744 | 12/1969 | Beyers et al. | 134/104 X |

Primary Examiner—Jeffrey V. Nase
Attorney, Agent, or Firm—Basile, Weintraub & Hanlon

[57] ABSTRACT

A trough and trough support for conveying liquids along open modular chuting is disclosed. The trough support is releasably secured to the sidewall of the open modular chute. The trough, in a preferred embodiment, is pleated to allow the trough to curve.

9 Claims, 10 Drawing Figures

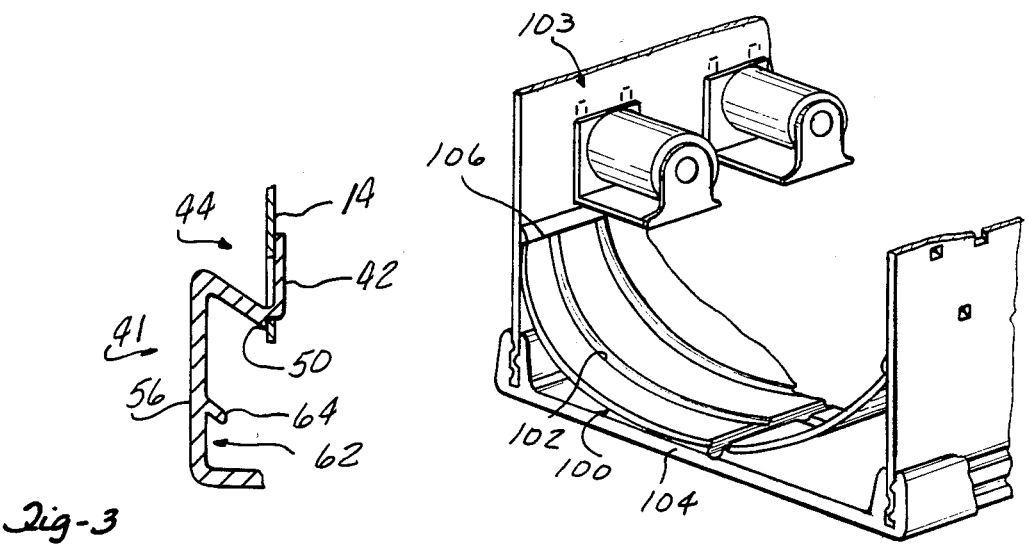
Fig-3
Fig-1
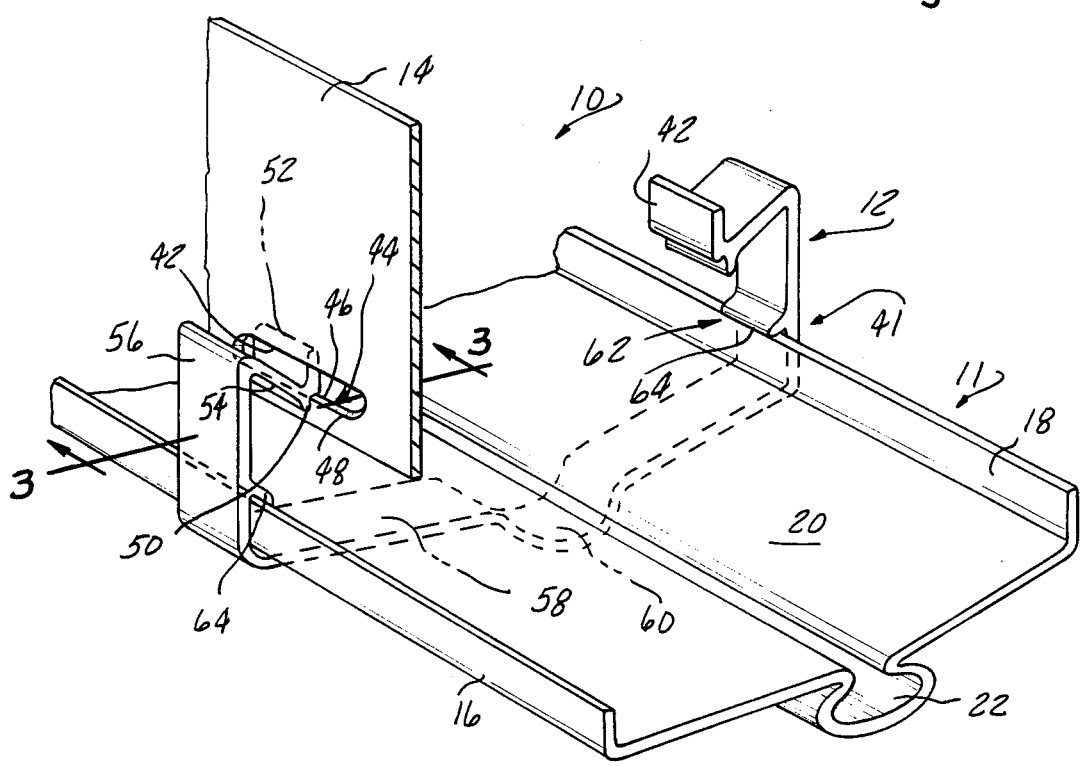
Fig-2
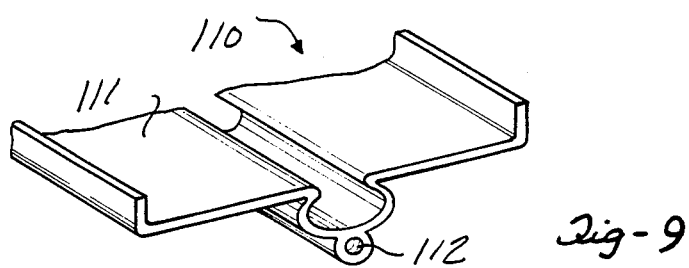
Fig-9

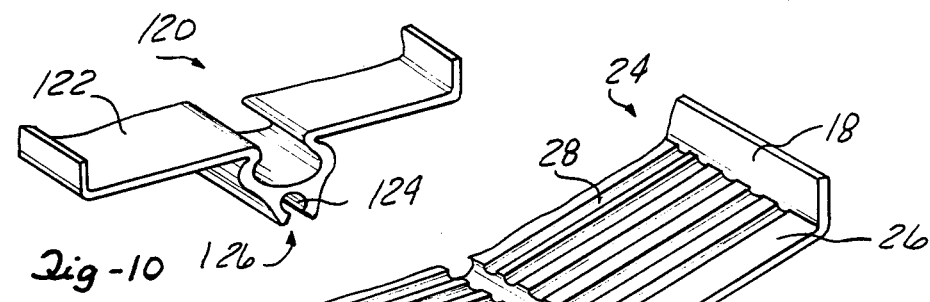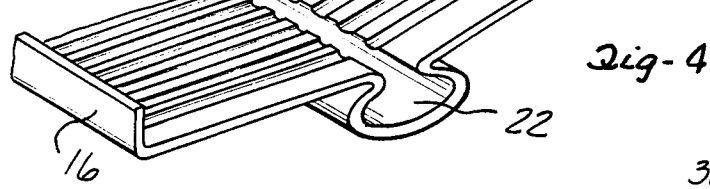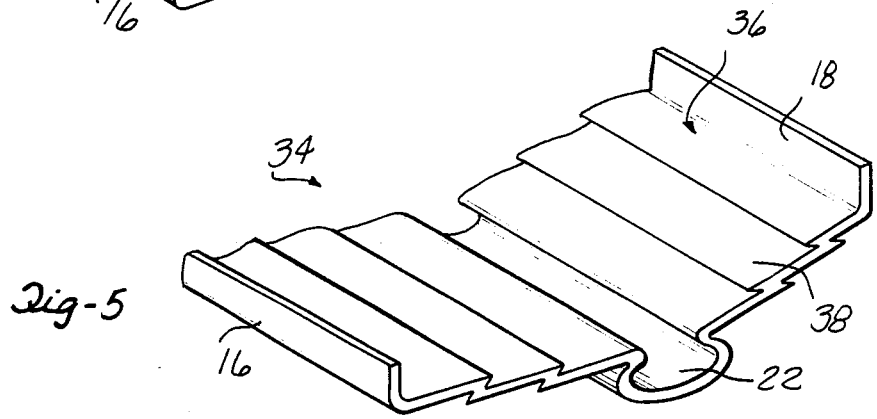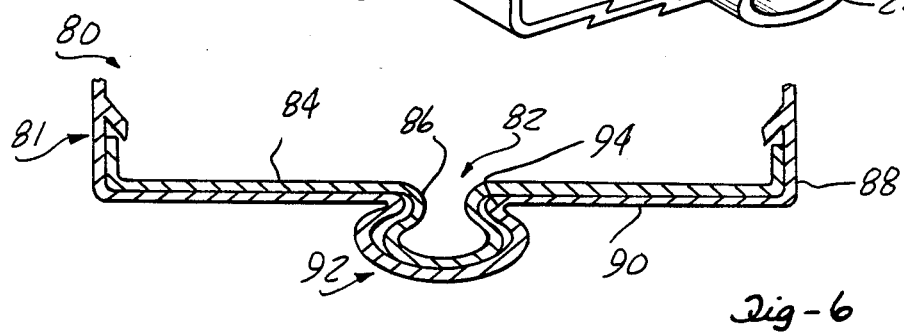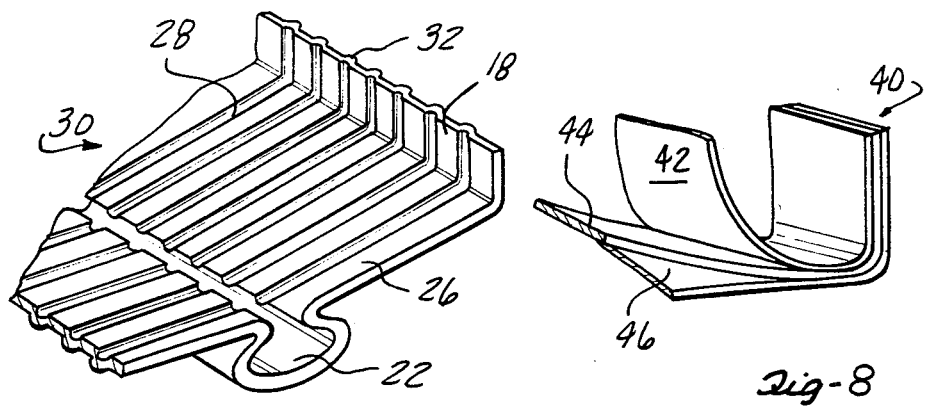

4,574,933

TROUGH FOR OPEN MODULAR CHUTE

BACKGROUND OF THE INVENTION

I. Field of the Invention

The present invention generally relates to material handling devices and, in particular, the present invention is concerned with a trough for open modular chuting for moving workpieces from one piece to another under gravity and along the chute.

II. Description of the Prior Art

Chutes, both linear and curved, for conveying parts from one location to another are well known in the art. A variety of methods have been proposed for joining and supporting chutes as well as for providing chutes with projections and supports along their inside walls to aid in part conveyance. Examples of chutes and chute systems in the prior art are disclosed in U.S. Pat. Nos. 1,252,616; 971,087; 2,218,444; 2,284,488; 4,198,043 and 3,915,275. Examples of chutes and chuting systems having a non-linear form are disclosed in U.S. Pat. Nos. 424,271; 790,776; 1,013,292; 1,256,724; 1,720,843; 1,802,089; 3,343,793; and 3,837,452. These patents are relevant to the Applicant's invention in that they represent the closest prior art for utilizing chutes to convey parts from one location to another under gravity. They do not, however, disclose or anticipate the device of the present invention of a trough releasably secured to the chute for catching liquids that ay drop from parts carried by the chute and conveying the liquid under gravity to a collection point.

III. Prior Art Statement

The aforementioned prior art, in the opinion of the Applicant and the Applicant's attorney, represents the closest prior art of which the Applicant and his attorney are aware.

SUMMARY OF THE INVENTION

The present invention, which will be described in greater detail hereinafter, comprises a modular chute for passing a workpiece therealong which includes a plurality of lengths of chute having spaced apart sidewalls held in a spaced relationship by a plurality of transverse clips attached to the upper and lower edges of the sidewalls. Grooves or recesses formed along sidewalls of the chute are utilized to selectively attach a variety of wear-resistant members to the walls of the chute to minimize wear and to assist in the movement of the workpieces along the chute. The grooves or recesses are utilized to secure a trough under the chute for collecting liquids that may drop from the workpiece.

In a preferred embodiment, the present invention discloses a sidewall supported continuous trough suspended below the chute for collecting and conveying liquids that drop from parts carried by the chute.

It is therefore a primary object of the present invention to provide a new and improved modular chute system utilizing a side wall supported trough to collect and convey liquids that drop from parts carried by the chute.

It is a further object of the present invention to provide a liquid conveying trough for a modular chute system which is capable of being formed into an arcuate to follow the curvature of the chute.

It is yet another object of the present invention to provide pleats or convolutions along the trough to allow the trough to curve without puckering.

It is yet another object of the present invention to provide an improved liquid conveying trough for chute systems which may be readily and inexpensively installed.

Further objects, advantages and applications of the present invention will become apparent to those skilled in the art of conveyors and chute systems when the accompaying description of one example of the best mode contemplated for practicing the invention is read in conjunction with the accompanying drawing.

BRIEF DESCRIPTION OF THE DRAWING

The description herein makes reference to the accompanying drawing wherein like reference numbers refer to like parts throughout the various views, and wherein:

FIG. 1 illustrates a broken perspective view of an open chute with a removable flexible trough for carrying liquid drained from the work space.

FIG. 2 illustrates a broken perspective view of the trough and trough support of the present invention;

FIG. 3 illustrates a broken cross-sectional view of an alternate configuration of the trough support bracket;

FIG. 4 illustrates a broken perspective view of a liquid carrying trough with convolutions formed in the trough bottom wall;

FIG. 5 illustrates a broken perspective view of a trough having longitudinal pleats formed along the trough bottom wall;

FIG. 6 illustrates a cross-sectional view of an alternate configuration of a trough and trough support wherein the trough's support releasably grasps the trough at the trough channel;

FIG. 7 illustrates a broken perspective view of a trough having convolutions formed in the trough bottom wall and side walls;

FIG. 8 illustrates a broken perspective view of a portion of a trough formed from co-extruded laminated materials;

FIG. 9 illustrates a broken cross-sectional view of a trough with a co-extruded stiffener bar; and FIG. 10 illustrates a broken cross-sectional view of a trough having an insertable stiffener bar.

DESCRIPTION OF THE PREFERRED EMBODIMENT

Referring now to the drawing, and in particular, FIG. 2, there is illustrated at 10 a device adapted for use with open modular chuting for conveying liquids that may drop from workpieces carried by the chute. The device 10 comprises a trough 11 carried by a support means 12 which is releasably secured to a trough sidewall 14.

The trough 10 comprises pair of spaced apart upright walls 16, 18 and a bottom wall 20 integral with the upright walls and extending therebetween. A recessed channel 22 is formed in the bottom wall 20 to collect and convey liquids and completely drain the bottom wall 20. The bottom wall 20, in a preferred embodiment, slopes gently from where it joins the side walls 16, 18 downward and inward to join the recessed channel 22 at a center portion.

FIG. 4 of the drawing illustrates at 24 a modified trough having a bottom wall 26 that is designed to flex and enable the trough to follow the arcuate curvature of the chute to which it may be attached. The bottom wall 26 includes a plurality of transverse depressions 28 formed in the bottomm wall with the depressions 28 in communication with the recess channel 22 to allow an unobstructed flow of liquid into the recess channel. The transverse depressions 28 provide lateral stiffness for the bottom wall 26 and allow the outside portion of the bottom wall which is traversing a curve to stretch and the inside portion of the bottom wall to contract and traverse its curve without puckering.

As shown in FIG. 7 of the drawing, there is illustrated at 30 a second modified trough having a plurality of vertical depressions 32 formed in the upright wall 18 and blending with and extending into the plurality of transverse depressions 28 to provide a smooth flow of liquid into the recess channel 22. In a preferred embodiment the plurality of vertical depressions 32 are formed continuously with the plurality of transverse depressions 28 and smoothly communicate with the recess channel 22 to provide unobstructed flow of liquid into the recess channel. It is obvious to the skilled artisan that the plurality of vertical depressions 32 combined with the plurality of transverse depressions 28 allow considerable flexibility in the trough 30 so that it can be formed in an arcuate to curve with the trough to which it is attached. The spaced upright walls 16, 18, because of the pleating effect of the transverse and vertical depressions, allow the spaced upright walls 16, 18 to stretch and contract to conform to the desired curvature. It is also obvious that the transverse depression 28 and the vertical depression 32 stiffen the trough 38 in a transverse manner which allows the trough to be formed from thin plastic material thus saving considerable weight and material costs.

Referring now to FIG. 5 of the drawing, there is illustrated at 34 a third modified trough having a bottom wall 36 which includes a plurality of longitudinal overlapping pleats 38. The longitudinal pleats 38 provide longitudinal stiffness for the bottom wall 36 while allowing the bottom wall to form an arcuate without puckering. In a preferred embodiment the bottom wall 36 slopes gently toward a center portion to communicate with the recess channel 22 and allow unobstructed flow of liquid into the channel 22 for complete draining of the trough.

Referring again to FIG. 2 of the drawing, the channel 10 in a fourth modification can be made from a can be gently heated and stretched to form an arcuate conforming to the curvature of the chute to which it is to be attached. Once the curve is set the trough is allowed to cool to ambient temperature and retains its desired shape. A thermal plastic trough is not limited to the use of poly vinyl chloride. Rather, any of a wide selection of thermal plastic materials may be utilized to form the trough depending upon economic and environmental considerations.

FIG. 8 of the drawings illustrates at 40 a trough formed from co-extruded materials. In some instances it may be necessary to convey liquids that are not necessarily compatible with the most economical trough materials. For example, it may be necessary to convey acid or caustic materials that may attack, for example, poly vinyl chloride. In a coextruded trough as illustrated in FIG. 8, an inner layer 42 of the trough includes a thin layer of plastic material impervious to the liquid to be conveyed. A heavy center layer 44 of an expensive plastic material forms the bulk of the trough, and a bottom layer 46 of plastic compatible with the ambient conditions is bonded to the center layer 44. Utilizing the coextruded trough 40, a wide variety of physical attributes for the trough is possible at an economical cost.

As shown in FIG. 2 of the drawing, the liquid conveying device 10 includes a support means 12 for releasably securing the trough 10 to the side wall 14. The support means 12 comprises a support bracket 41 including a vertical flange 42 releasably engageable with an opening 44 formed in the side wall 41. A lower end 46 of the vertical flange 42 rests on a lower edge 48 of the opening 44. A lip 50 extends downward from the vertical flange 42 and abuts an outer surface of the side wall 14. An upper end 52 of the vertical flange 42 extends past the opening to abut an inner surface of the side wall and secure the vertical flange to the side wall 14 in a releasable manner. An outward projecting arm 54 is formed integral with the vertical flange and extends outward and upward a distance to project beyond the chute side wall 14 and accommodate a trough wider than the chute in a manner which will be described subsequently. The outward projecting arm 54 extends downward at an outer end thereof to form a vertical wall 56. The vertical wall 56 extends inward at a lower end to form a bottom wall 58. The bottom wall 58 includes a downward extending recess 60 adapted to clear the recess channel 22. The vertical flange 42 engaging the opening 44 with the upper end abutting the inner surface of the chute sidewall 14 and the lip 50 abutting the outer surface of the chute side wall 14 defines a means for releasably securing the support means 12 to the chute side wall 14, and supporting a trough wider than the chute.

As illustrated in FIG. 3 of the drawing, the bracket 41 includes a means 62 for releasaby securing the trough 10 to the bracket 41. The means 62 comprises a projection 64 extending inward and downward from the vertical wall 56 and overlaying the trough side walls 16, 18 to snugly retain the trough in abutment with the bracket 41.

In an alternate embodiment as shown in FIG. 2 of the drawing, there is illustrated at 66 an alternate means for releasably securing the trough 10 to the chute side wall 68. The means 66 comprises a plurality of grooves 75 formed horizontally along the chute side wall 68. A support bracket 70 includes a pair of upward extending spaced legs 72, 74 at each end of a bottom wall 76. The spaced legs 72, 74 having projections complimentary to the plurality of grooves 75 to snugly retain the bracket 70, to the side wall 68.

FIG. 36 of the drawing illustrates at 80 an additional embodiment of the present invention with a trough support means releasably engageable with the chute. The trough comprises a channel 82 formed centrally in the bottom wall 84. The channel 82 is formed from an extension of the bottom wall 84 which extends downward and outward a distance then curves arcuately inward then curves upward and inward to meet the bottom wall 84 in a continuous manner to form a channel that has a pinched-in neck section 86 in communication with the bottom wall of the trough. A bracket 88 is adapted to be releasably engageable with the chute 81. The bracket 88 includes a bottom portion 90 in abutment with the channel 82 and includes a recess 92 in complimentary abutment with the channel 82, the recess extending downward and outward then curving inward in an arcuate manner, then curving upward in an arcuate manner to meet the bottom portion 90 in a continuous manner. The reces 692 having a recess neck 94 to releasably engage the neck portion 86 to releasably engage the trough 81 to the bracket 88.

Referring to FIG. 1 of the drawing there is illustrated a trough 100 carried along the bottom portion of the chute to convey liquids and fluid drained from the workpiece from the trough. The trough 100 includes a plurality of transverse convolutions 102 extending across the trough. The convolutions 102 give the trough flexibility enabling it to conform to any curvature in a chute and still provide a continuous seamless conveyance for liquids. The convolutions 102 meet at the center of the trough a central depression 104 which is the low point of the trough and provides for complete drainage of the convolutions 102 and thus completes drainage of the trough 100. Preferably the convolutions are inclined from the sidewall in a direction toward the drainage point. This produces a herring bone effect that aids in drainage of the trough. An overhanging lip 106 is provided to secure the trough 100 between sidewalls of the chute. Alternately, (clips not shown) may be attached to the sidewall to secure the trough 100 in place. Rollers 103 are provided to support a workpiece that is moved along the trough.

Referring now to FIG. 9 of the drawing there is shown at 110 a trough 111 having a co-extruded stiffener bar 112 running longitudinally along the trough. Preferably, the trough 111 is made from plastic which surround and retains the stiffener bar 112. The stiffener bar 112 may be made from rigid plastic, thermoplastic plastic, or steel. The stiffener bar 112 provides longitudinal stiffness to the trough and can be bent to form an arcuate for directing the trough around corners following the chute to which it is attached.

FIG. 10 illustrates at 120 an alternate configuration of a trough 122 with a stiffener bar 124 attached to the trough by insertion into a groove 126. This trough configuration allows the stiffener bar 124 to be selectively added to the trough when needed and where needed. For example, the stiffener bar 724 can be prebent to an arcuate form and inserted into the groove 126 to form the trough 122 in an arcuate where the curvature is desired. Also, the stiffener bar 126 can be added to prevent sagging of the trough between supports, but eliminated where sufficient support is available.

It can thus be seen that the present invention has provided a new and improved device for passing a workpiece along a chute and for catching and conveying liquids that drain from the workpiece. It is obvious to the skilled artisan that the trough and its support can be made from a variety of materials including injection molded plastic, extruded plastic etc. It is contemplated that the support member can be made economically from reinforced Nylon, PVC or Delrin, although the teachings of the invention are not limited to these materials.

It is also obvious to the skilled artisan that, in the preferred embodiment, the chute may be assembled in a curved or serpentine manner with the clips maintaining the sidewalls in a properly spaced and vertical position for the movement of the workpiece under gravity. In a serpentine open chute configuration it is recommended that the trough described and claimed be used to catch and convey any liquid that may drain from the parts.

It should be understood by those skilled in the art of modular chutes that other forms of the Applicant's invention may be had, all coming within the spirit of the invention and the scope of the appended claims.

Having thus described my invention, what I claim is:

1. In an open chute for conveying parts under gravity, the improvement comprising:
    a trough attached to the chute for conveying liquids along a linear path under gravity and including:
    a pair of spaced-apart walls;
    a bottom wall integrel with said upright walls and extending therebetween; and
    a recessed channel formed in said bottom wall;
    a support means for securing said trough to the chute;
    said support means comprising an opening formed in the chute, a bracket releasably engagable with said opening, and said trough resting on said bracket;
    said bracket comprising a vertical flange releasably engagable with said opening, a lower end of said vertical flange resting on a lower edge of said opening, a lip extending downward from said vertical flange abutting the chute walls, an outward projecting arm integral with said vertical flange, said outward projecting arm extending downward at an outer end thereof to form a vertical wall, said vertical wall extending inward at a lower end to form a bottom wall, said bottom wall contoured to abut and support said trough;
    means for releasably securing said trough to said bracket; and
    wherein said bracket supports a trough wider than the chute.

2. The chute as defined in claim 1 wherein the trough comprises a plurality of transverse depressions formed in said bottom wall, said transverse depressions in communication with said recessed channel allowing unobstructed flow of liquid into said recessed channel; and wherein said transverse depressions provide lateral stiffness for said bottom wall while allowing said trough to curve without puckering.

3. The chute as defined in claim 2 wherein said trough further includes transverse depressions extending vertically into said upright walls allowing said upright walls to stretch and contract forming an arcuate with said bottom wall.

4. The chute as defined in claim 1 wherein said trough bottom wall includes a plurality of longitudinal overlapping pleats wherein said longitudinal pleats provide longitudinal stiffness for said bottom wall while allowing said bottom wall to form an arcuate without puckering.

5. The chute as defined in claim 1 wherein said trough is formed from a thermoplastic material and heating of said trough above a predetermined temperature allows said trough to be formed in an arcuate, and cooling to ambient temperature sets said trough in the arcuate form.

6. The invention as defined in claim 1 wherein the means for securing said trough to said bracket comprises a projection extending inward and downward from said vertical wall overlaying said trough to snugly retain said trough in abutment with said bracket.

7. The trough as defined in claim 1 wherein said trough includes a stiffener bar extending longitudinally along said trough to provide longitudinal support.

8. The trough as defined in claim 7 wherein said stiffener bar is co-extruded with said trough and is enclosed in said trough material.

9. The trough as defined in claim 7 wherein said trough includes a recess to retain said stiffener bar.

* * * * *